Nov. 10, 1959  C. BUDDINGH ET AL  2,912,055
WEEDER
Filed April 14, 1955   2 Sheets-Sheet 1
Fig-1-
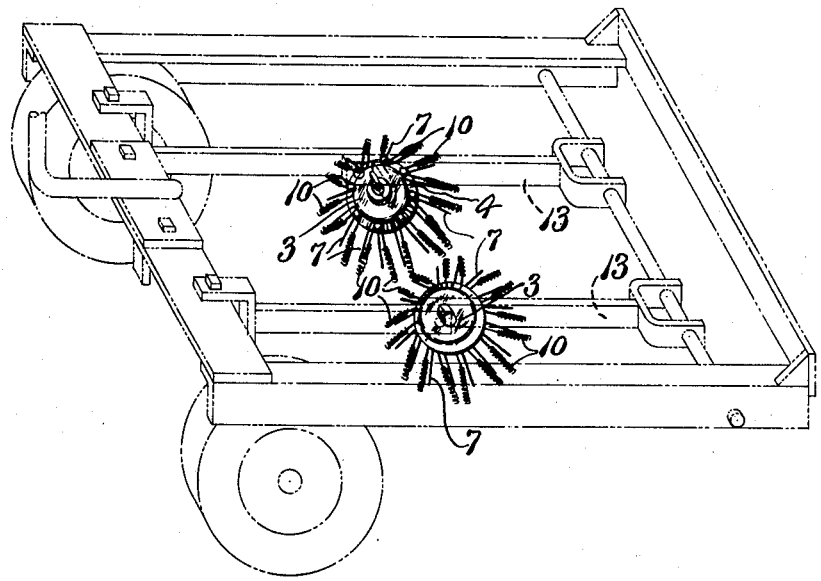
Fig-2-
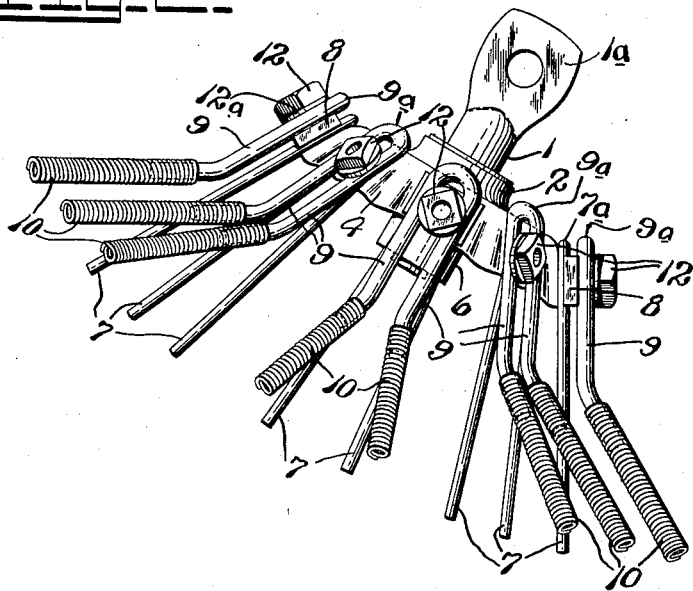
INVENTORS
Cornelius Buddingh
Marinus J. Buddingh
BY Frank E. Liverance, Jr.
ATTORNEY

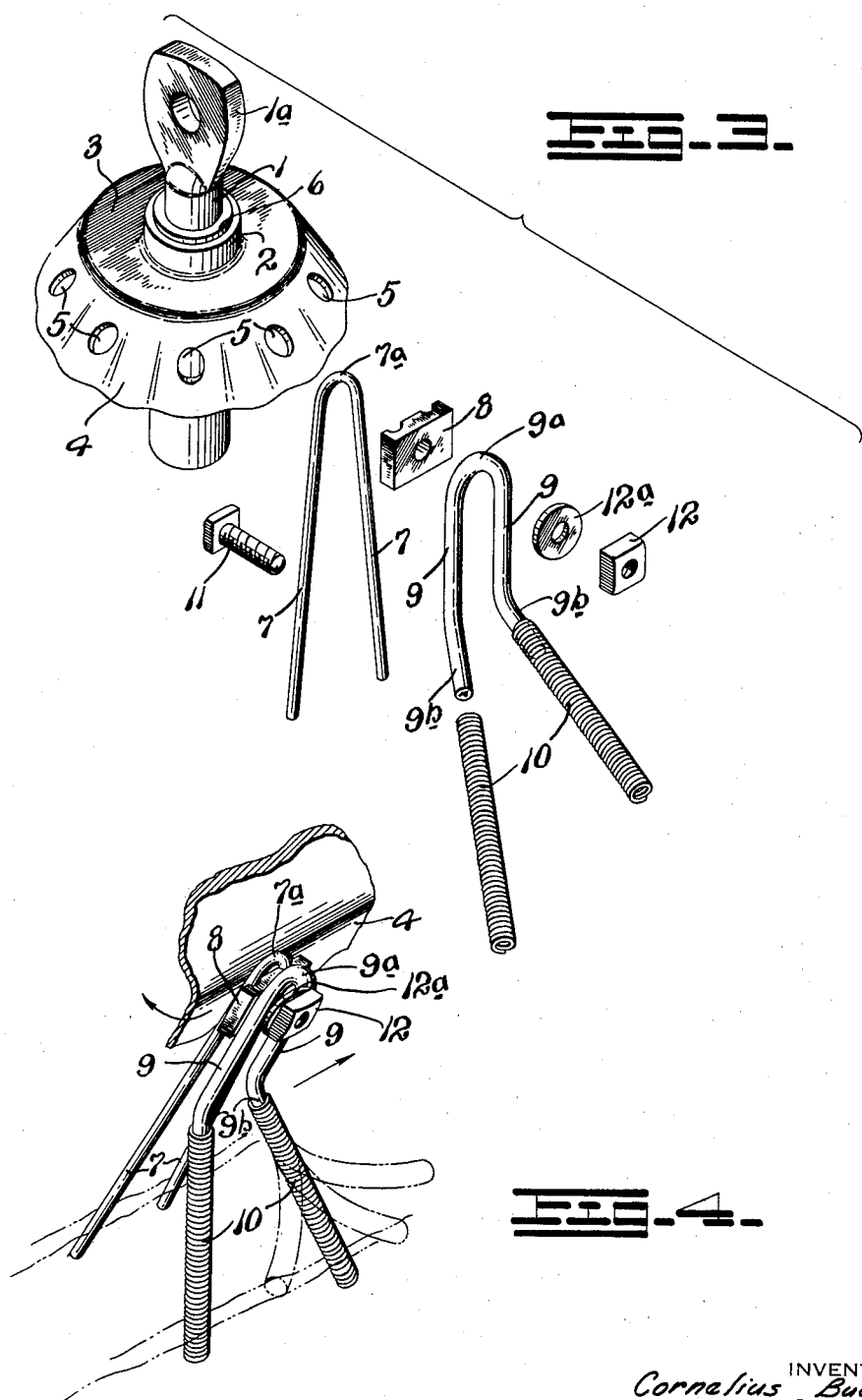

United States Patent Office 2,912,055
Patented Nov. 10, 1959

2,912,055

WEEDER

Cornelius Buddingh and Marinus J. Buddingh, Caledonia, Mich.

Application April 14, 1955, Serial No. 501,385

8 Claims. (Cl. 172—526)

The present invention relates to a novel and very efficient weeder for plants, especially when such plants are in rows. It is particularly useful when the plants are small for effectively removing weeds shortly after they have germinated. Such weeds are liable to grow in part closely adjacent the plants and between them in the rows, the ordinary cultivation of the ground taking care of most of the weeds between successive rows of plants but not coming close enough to the plants in the rows to remove and kill weeds which are in close association with the plants or between the plants in a row. Various plants which are in rows include celery, onions, corn and beans and many others. Heretofore, particularly in conjunction with celery and onions, and the same is true to a large degree with all other plants which are in rows, it has been necessary to weed the rows of plants by hand. Weeds immediately adjacent the plants and between them, if not eradicated at an early date grow rapidly, the roots penetrating deeply into the soil and if neglected will withdraw a large portion of the nourishment which should go to the plants.

With our invention a relatively simple but very practical and effective weeder for plants is provided which, with one of them located at each side of a row of plants and mounted to be drawn lengthwise thereof, not only breaks the ground surface adjacent a row of plants at each side thereof but in addition engages such ground surface close to the plants and sweeps the ground immediately adjacent the plants, projecting the upper portions of the surface at the plants away therefrom so that the weeds which have germinated are in a large measure removed and thrown away from the plants. Furthermore, by further utilizing a weed sweep apparatus which we have invented and upon which we made application for patent, Serial No. 451,528, filed August 23, 1958, now abandoned, to follow the weeders of the present invention, there is greater assurance of removing substantially all of such undesirable weeds. Accordingly, with the use of our invention alone or in conjunction with the other invention made by us above noted the long tedious, dirty and expensive hand weeding is substantially eliminated.

Our invention may be understood from a preferred embodiment thereof, illustrated in the accompanying drawings, an understanding of which may be had from the following description. In such drawings, Fig. 1 illustrates in perspective two of the weeders of our invention showing how they are mounted upon a movable support therefor for drawing lengthwise of a row of plants.

Fig. 2 is a side elevation of the weeder of our invention substantially at the angular position which it occupies when in use.

Fig. 3 is an exploded or disassembled perspective view of the parts and elements used in constructing the weeder unit of our invention, and Fig. 4 is a fragmentary perspective view showing the manner in which the ground is engaged, broken and swept as the weeder units are moved lengthwise of a plant row.

Like reference characters refer to like parts in the different figures of the drawings.

In the construction of the weeder unit, two of which are preferably used, a short shaft 1 flattened as indicated at 1a at its upper end passes downwardly through a sheet metal dome of generally frusto-conical form having a central upwardly extending hub 2 in its upper flat side 3 from the peripheral edges of which a downwardly and outwardly inclined continuous annular skirt 4 extends as best shown in Fig. 3. At spaced intervals around the skirt 4 openings 5 are made therethrough. In practice an elongated sleeve 6 may extend upwardly through the hub 2 and be permanently secured therewith and the shaft 1 extends through the sleeve so that such frusto-conical dome which has been described freely rotates on the shaft 1.

At each of the openings 5, the upper end portion of an inverted U-shaped member having downwardly diverging legs 7 integrally connected at their upper ends by the bends 7a is positioned. Such legs 7 extend downwardly from the skirt 4. A spacing block 8 of the form shown is located over the upper end portions of the inverted U-members mentioned, grooved at its inner side to embrace the legs 7 near the bend 7a, and having a central opening therethrough.

A second U-shaped member having spaced legs 9 connected by an upper bend 9a is located adjacent said upper bend over each spacing block 8. Such legs 9 a distance below the bend 9a, are bent outwardly at an acute angle to the legs 7 providing angularly disposed terminal sections 9b. On each of said sections 9b an elongated flexible member 10 is secured, at its upper end portion gripping the section 9b and being shiftable to different positions thereon. The flexible members 10 preferably are in the form of continuous closely adjacent coils, the inner diameter being such that when inserted over the extensions 9b such extensions are tightly gripped by the coils.

A headed screw 11 is located with the head thereof at the inner side of the skirt 4 at each of the openings 5. The shank of the screw 11 passes through such opening adjacent the upper bends 7a and 9a and through the block 8. A binding nut 12 is screwed onto the outer end of the screw 11 against a washer 12a which is between the nut and legs 9 a short distance below the upper bend 9a of the last described U-shaped members.

With such weeder structure as described, each having a plurality of downwardly extending legs 7 which are free at their lower ends and downwardly and angularly disposed flexible members 10, also free at their lower ends, two of such units are mounted on a suitable drawn support, as indicated in dashed lines in Fig. 1, at or approximately at the angles shown in Fig. 2, one at each side of a row of plants. The upper end portions of the shafts 1a of the shafts 1 may be mounted on suitable brackets permanently secured to spaced parallel bars 13 of the drawn carrier, such bars 13 are mounted on wheels shown in phantom.

When thus drawn over the ground and with one of the weeder units at each side of a row of plants, the lower ends of the legs 7 penetrate the ground a distance outward from the plants of the row, while the lower ends of the flexible members 10 reach the ground and may more lightly penetrate it immediately adjacent the plants. The angular bend of the lower sections 9b of the legs may be varied so that the distances between the free ends of the legs 7 and flexible members 10 are likewise varied. As the drawn implement upon which the weeding units are mounted moves lengthwise of a row of plants, the penetration of the lower end portions of the legs 7 nearest to the plants causes the weeder units to automatically turn about shafts bringing the lower ends of the legs 7 successively to the ground for penetration thereof until a sufficient arc of rotation of the carrying head of the ground engaging members has taken place, whereup the lower free ends of the legs 7 which have penetrated the ground rise above it and do not again enter the ground until the next succeeding rotation takes place.

Such entry into the ground and the rotative movement of the weeders breaks the ground surface at the places where the lower end portions of the legs 7 have penetrated. Such penetration may be adjusted so as to be a preselected amount, in practice approximating one inch in depth though it may be varied in either direction therefrom to a limited extent.

The lower ends of the flexible elements 10 successively reach the ground and slightly penetrate it very close to the plants in a row of plants. The roots of such plants well below any free penetration of the members 10, the ground being loosened and broken by the legs 7, when the flexible elements come to the ground with the rotation of the weeding element being clockwise or in the direction indicated by the upper arrow in Fig. 4, the first action is for the lower end portions of said elements 10 to bend to the right, dragging and sweeping the ground immediately adjacent the plants until when one of such elements leaves the ground the release of the flexible elements causes it to swing to the left, due to such first bending and thus the lower end portions of each of the yielding spring elements 10 throws or projects surface portions of the ground away from the plants. On its return toward normal position it may swing beyond such position to the right. Thus there is a sweeping action in both directions by each of the flexible spring elements 10 as it leaves the ground.

With the weeding unit of the construction shown in our invention and operating as described, the weeds immediately adjacent the plants in a row of plants or between them are in large measure moved away from the plants. When the weeds are small or very shortly after germination, their roots penetrate the ground only a short distance, at a maximum generally not exceeding one-quarter inch. The roots of onions, celery and other plants at a minimum are usually at least one inch below the upper surface of the ground. The plants are not damaged. The weeds are substantially all removed to a distance from the plants in a row of plants and for a completion of the weed removal an immediate following by the weed sweeping apparatus which we have invented and which has been referred to above completes the operation so that weeding plants in rows is expeditiously and economically accomplished.

The invention is defined in the appended claims and is to be considered comprehensive of all forms of structure coming within their scope.

We claim:

1. Structure as described comprising, a shaft, a generally circular head rotatably mounted on said shaft for rotation about an axis inclined downwardly between the horizontal and vertical, a plurality of generally equally spaced rods secured adjacent one to another around said head extending radially outward from said shaft and diverging from each other at their outer end portions, each rod being inclined at substantially the same acute angle to the axis of said shaft, the lower ends of said rods lying generally on a first curvilinear locus line, a second plurality of generally equally spaced shorter rods secured around said head, radially outward from the shaft, having portions adjacent the head parallel to the first rods, and outer end portions diverging outwardly from said first rods, and an elongated flexible member secured at one end to each of said diverging portions and aligned therewith, said flexible members each having a free end portion yieldingly resistant to strain thereof from alignment with said diverging end portion of the second rod to which connected the lower ends of said end portions lying generally on a second curvilinear locus line, said locus lines being sufficiently close to one another so as to both intersect the ground when said head is in weeding operation.

2. Structure as defined in claim 1, each flexible member comprising a continuous series of closely adjacent coils of wire, the inner diameters of which are such that end coils placed over diverging portions of said second rods, grippingly engage therewith.

3. In a weeding apparatus: a rotatable head; means for mounting said head for rotation about a downwardly inclined axis lying between the horizontal and vertical; a plurality of rods mounted on said head, said rods extending downwardly and outwardly from said head, the lower ends of said rods generally lying on a first curvilinear locus line; a plurality of resilient members mounted on said head, said members extending downwardly and outwardly from said head, the lower ends of said members generally lying on a second curvilinear locus line; and said second curvilinear locus line lying outside said first curvilinear locus line and said locus lines being sufficiently close to one another so as to both intersect the ground when said head is in weeding operation.

4. In a weeding apparatus: a rotatable head; means for mounting said head for rotation about a downwardly inclined axis lying between the horizontal and vertical; a plurality of rods mounted around said head, said rods extending downwardly and outwardly from said head, the lower ends of said rods generally lying on a first curvilinear locus line and adapted to engage the ground for rotation of the apparatus; a plurality of shorter rods mounted around said head, said shorter rods extending downwardly and outwardly of said head generally lying on a second curvilinear locus line; said shorter rods having end portions extending at an angle outwardly greater than that of the main body of said shorter rods; and flexible, resilient members mounted on said end portions, said members adapted to engage the ground in a sweeping, stirring manner the lower ends of said members generally lying on a second curvilinear locus line and said locus lines being sufficiently close to one another so as to both intersect the ground when said head is in weeding operation.

5. Structure as defined in claim 4, said members comprised of a wire coil spring.

6. In weeding apparatus, a rotatable generally circular head, means for mounting said head for rotation about a downwardly inclined axis of rotation lying between the horizontal and vertical, a continuous series of U-shaped rods each having two legs extending downwardly and outwardly and free of each other, the upper ends of said rods reaching to and engaging said head, the lower ends of the legs of said rods lying generally on a curvilinear locus line in a plane inclined to the horizontal, and means for adjustably connecting each of said U-shaped rods to said head for adjustment thereof in the direction of the length of the legs of said rods; and a second series of shorter U-shaped rods located outwardly from the first series, each having two downwardly and outwardly inclined spaced legs located outwardly of the legs of the first U-shaped rods, said means for adjustably connecting the first U-shaped rods to the head also adjustably connecting the second series of U-shaped rods to said head, and flexible extensions to the legs of said second series of U-shaped rods extending therefrom and aligned therewith and having free, flexible outer end portions, the lower ends of said end portions lying generally on a second curvilinear locus line and said locus lines being sufficiently close to one another so as to both intersect the ground when said head is in weeding operation.

7. Structure as described comprising, a shaft adapted to be mounted with its axis inclined downwardly between the horizontal and vertical, a dome of frusto-conical form rotatably mounted on said shaft, said dome having a depending skirt, a plurality of outwardly and downwardly inclined spaced rods secured to said skirt therearound having free end portions extending below said skirt, said rods having with respect to each other substantially the same angle of inclination to the axis of said shaft, the lower ends of said rods lying generally on a first curvilinear locus line; a plurality of shorter additional spaced rods secured to and extending below said skirt therearound outwardly of the first rods, each at its lower end portion terminating in a section inclined outwardly at an obtuse angle to the body of the rod to which it is connected, and a flexible elongated member connected with each of said inclined sections at the upper end portion of said member, extending downwardly therefrom and having a lower end, free yieldable portion, the lower ends of said members lying generally on a second curvilinear locus line and said locus lines being sufficiently close to one another so as to both intersect the ground when said head is in weeding operation.

8. In weeding apparatus, a rotatable head, means for mounting said head for rotation about an inclined axis of rotation extending downwardly between the horizontal and vertical, a continuous series of spaced rods secured at upper ends to said head and a flexible member secured at one end to the lower end portion of each rod, aligned therewith, and having a free, yieldingly resisting end portion extending beyond the rod to which it is attached, the lower ends of said end portions generally lying on a first curvilinear locus line in a plane inclined to the horizontal, and a plurality of spaced longer rods secured at their upper ends to said head, the lower ends of said rods generally lying on a second curvilinear locus line and said locus lines being sufficiently close to one another so as to both intersect the ground when said head is in weeding operation.

References Cited in the file of this patent

UNITED STATES PATENTS

| | | |
|---|---|---|
| 149,371 | Benson | Apr. 7, 1874 |
| 430,077 | Jenness | June 10, 1890 |
| 481,841 | Bourgin | Aug. 30, 1892 |
| 622,162 | Pattisson | Mar. 28, 1899 |
| 692,585 | Adams | Feb. 4, 1902 |
| 888,348 | Nichols | May 19, 1908 |
| 1,076,398 | Vrooman et al. | Oct. 21, 1913 |
| 1,542,963 | Russell | June 23, 1925 |
| 2,393,190 | Ritenour | Jan. 15, 1946 |

FOREIGN PATENTS

| | | |
|---|---|---|
| 20,898 | Great Britain | Oct. 4, 1898 |